United States Patent
Moore et al.

(10) Patent No.: US 9,460,369 B2
(45) Date of Patent: Oct. 4, 2016

(54) ON-DEMAND SHELF SIGNAGE PRINTING

(71) Applicant: XEROX CORPORATION, Norwalk, CT (US)

(72) Inventors: Steven R. Moore, Pittsford, NY (US); Wencheng Wu, Webster, NY (US); Dennis L. Venable, Marion, NY (US); Thomas F. Wade, Rochester, NY (US); Peter Paul, Penfield, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/514,627

(22) Filed: Oct. 15, 2014

(65) Prior Publication Data
US 2016/0110633 A1 Apr. 21, 2016

(51) Int. Cl.
*G06K 15/00* (2006.01)
*G06K 9/78* (2006.01)
*H04N 1/00* (2006.01)
*H04N 1/21* (2006.01)
*G06K 9/00* (2006.01)
*H04N 5/225* (2006.01)
*G06Q 30/02* (2012.01)
*H04N 101/00* (2006.01)

(52) U.S. Cl.
CPC ............. *G06K 9/78* (2013.01); *G06K 9/00577* (2013.01); *G06Q 30/0276* (2013.01); *H04N 1/00278* (2013.01); *H04N 1/00562* (2013.01); *H04N 1/2154* (2013.01); *H04N 5/2251* (2013.01); *H04N 2101/00* (2013.01); *H04N 2201/0084* (2013.01)

(58) Field of Classification Search
CPC ... G06Q 20/20; G06Q 20/201; G06Q 20/203
USPC ............... 235/383, 385, 380, 462.45, 472.01
See application file for complete search history.

(56) References Cited

U.S. PATENT DOCUMENTS

| | | | | |
|---|---|---|---|---|
| 6,069,696 A | * | 5/2000 | McQueen | G01G 19/4144 235/383 |
| 2002/0167500 A1 | * | 11/2002 | Gelbman | G06F 3/14 345/204 |
| 2003/0189734 A1 | * | 10/2003 | Lee | H04N 1/1026 358/474 |
| 2008/0024306 A1 | * | 1/2008 | Bomber | G06K 7/10336 340/572.7 |
| 2009/0317161 A1 | * | 12/2009 | Vo | B41J 17/32 400/207 |
| 2013/0201502 A1 | * | 8/2013 | Rajendraprasad | H04N 1/00323 358/1.13 |
| 2014/0258317 A1 | * | 9/2014 | Kwan | G06Q 30/06 707/758 |
| 2014/0307273 A1 | * | 10/2014 | Kajihara | G06K 15/024 358/1.6 |

* cited by examiner

*Primary Examiner* — Daniel St Cyr
(74) *Attorney, Agent, or Firm* — MH2 Technology Law Group LLP

(57) ABSTRACT

The present disclosure relates to systems and methods for use in a retail store. An example system includes a mobile base, a printer, an image capture subsystem on the mobile base and coupled to the printer, the image capture system including at least one image capture device and at least one image processor, the image capture device configured to obtain images of items in the retail store, the image processor configured to derive item identification data from the images of items, and a control subsystem coupled to the printer and to the image capture subsystem, where the control subsystem is configured to receive information identifying items requiring signage, acquire item identification data from the image capture subsystem, determine, based on the information identifying items requiring signage and on the item identification data, items requiring signage, and to direct the printer to print signage for the items requiring signage.

8 Claims, 2 Drawing Sheets

ON-DEMAND SHELF SIGNAGE PRINTING

FIELD

This disclosure relates generally to signage usage and deployment in environments such as retail stores.

BACKGROUND

Retail chains, such as pharmacy, grocery, home improvement, and others, have affiliate retail stores in which products are presented on product display units, such as shelves, cases, and the like. Product information is generally displayed close to the product, on preprinted labels. The labels indicate the price of the item. Periodically, stores place some of the items on sale, or otherwise adjust prices. This entails printing associated signage and manually replacing product labels.

SUMMARY

According to an embodiment, a system for printing signage for use in a retail store is presented. The system includes a mobile base; a printer in physical contact with the mobile base; an image capture subsystem physically disposed on the mobile base and communicatively coupled to the printer, the image capture system comprising at least one image capture device and at least one image processor, the image capture device configured to obtain images of items in the retail store, the image processor configured to derive item identification data from the images of items; and a control subsystem communicatively coupled to the printer and to the image capture subsystem, where the control subsystem is configured to receive information identifying items requiring signage, acquire item identification data from the image capture subsystem, determine, based on the information identifying items requiring signage and on the item identification data, items requiring signage, and to direct the printer to print signage for the items requiring signage.

Various optional features of the above embodiment include the following. The system may include a plurality of image capture devices, where the image capture subsystem is further configured to obtain a single image of multiple items in the retail store using the plurality of image capture devices, and the image processor is configured to derive item identification data for the multiple items from the single image of multiple items. The image processor may be configured to derive item identification data from at least one of item signage and item packaging. The image capture subsystem may include multiple image capture devices, where the multiple image capture devices are configured to simultaneously obtain images of items at differing heights. The image capture device may be configured to be movably adjusted to capture images at a plurality of heights, and where the image capture subsystem is configured to provide height information to the control subsystem. The mobile base unit may be self-propelled. The mobile base may be configured to provide travel distance data to the control subsystem. The control subsystem may be further configured to acquire location information and generate, based on the location information, a map of item locations within the retail store. The control subsystem may be configured to prompt an operator to at least one of: move the system, install printed signage, or remove existing signage. The control subsystem may be further configured to receive information identifying items for which signage is to be removed, and determine, based on the information identifying items for which signage is to be removed and on the item identification data, items requiring signage removal, where the control subsystem is configured to prompt an operator to remove existing signage of the items requiring signage removal.

According to an embodiment, a method of printing signage for use in a retail store is presented. The method includes obtaining, by a control subsystem of a system for printing signage for use in a retail store, information identifying items requiring signage, the system for printing signage for use in a retail store comprising a mobile base, a printer in physical contact with the mobile base, an image capture subsystem physically disposed on the mobile base and communicatively coupled to the control subsystem, and the control subsystem, where the image capture subsystem includes at least one image capture device and at least one image processor, where the control subsystem is communicatively coupled to the printer and to the image capture subsystem; obtaining, by the image capture device, images of items in the retail store; deriving, by the image processor, item identification data from the images of items; acquiring, by the control subsystem, item identification data from the image capture subsystem; determining, by the control subsystem and based on the information identifying items requiring signage and on the item identification data, items requiring signage; and printing, by the printer, signage for the items requiring signage.

Various optional features of the above embodiment include the following. The obtaining, by the image capture device, images of items in the retail store may include: obtaining, by the image capture subsystem comprising a plurality of image capture devices, a single image of multiple items in the retail store; and deriving, by the image processor, the item identification data for the multiple items from the single image of multiple items. The deriving, by the image processor, item identification data from the images of items, may include deriving, by the image processor, the item identification data from at least one of item signage and item packaging. The image capture subsystem may include multiple image capture devices, and the method may further include obtaining, simultaneously, images of items at differing heights by the multiple image capture devices. The image capture device may be configured to be movably adjusted to capture images at a plurality of heights, and the method may further include providing, by the image capture subsystem, height information of the image capture device to the control subsystem. The mobile base unit may be self-propelled. The method may include providing, by the mobile base, travel distance data to the control subsystem. The method may include acquiring, by the control subsystem, location information; and generating, based on the location information, a map of item locations within the retail store. The method may include prompting, by the control subsystem, an operator to at least one of: move the system, install printed signage, or remove existing signage. The method may include obtaining, by the control subsystem, information identifying items requiring signage removal; determining, by the control subsystem and based on the information identifying items requiring signage removal and on the item identification data, items requiring signage removal; and prompting, by the control subsystem, an operator to remove existing signage of the items requiring signage removal.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

It would be advantageous to retail stores if signage were made available (e.g., printed or otherwise generated) as a store employee encounters the associated items (e.g., products) while walking down each aisle. However, retail chains, which generally determine signage appearance, generally cannot control or predict the item locations across each of their stores. This may be due to a number of factors, such as store manager discretion, local product merchandising campaigns, different store layouts, and so forth. Thus, individual stores may resort to manually pre-sorting the signage into the specific order appropriate for that store, which is a non-value-added process.

Accordingly, some embodiments provide a method and system for printing signage for use in a retail store on-demand, e.g., as the store employee encounters the associated items. Further, some embodiments identify items for which signage is to be removed, and notify the store employee in real time as the employee encounters such items. Yet further, some embodiments provide the ability to automatically generate a map of a store layout with locations of items within the store. These and other embodiments are discussed in detail herein.

Figure 1:
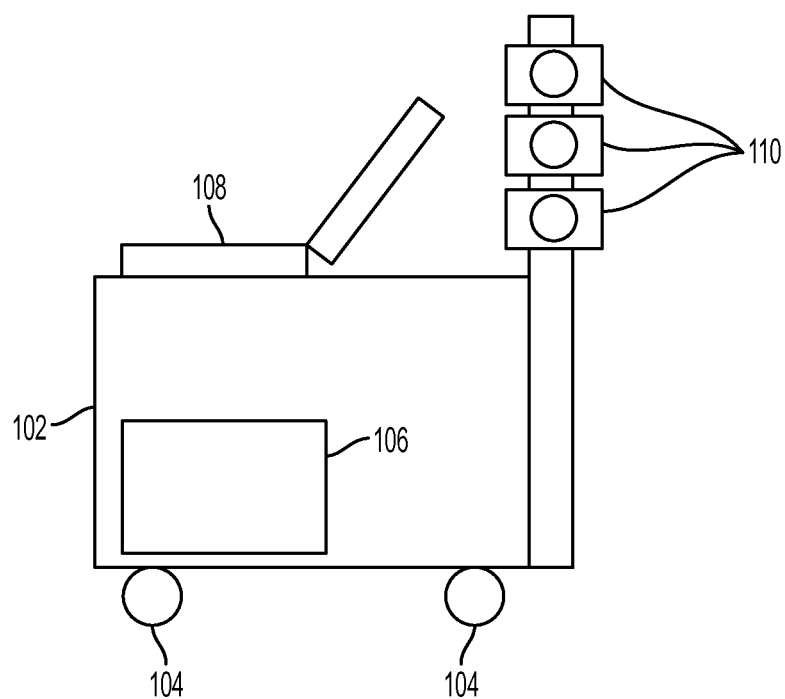
FIG. 1 is a schematic diagram of a system according to some embodiments.

FIG. 1 is a schematic diagram of a system according to some embodiments. The system of FIG. 1 is capable of capturing images of store shelves, implementing computer recognition of items on the shelves, determining which of the recognized items requires signage (e.g., for an upcoming sale), and printing the appropriate signage in real time. The system may be accompanied by at least one person responsible for guiding the system and for attaching the printed signage to the appropriate shelf. The system depicted in FIG. 1 includes mobile base 102, image capture devices 110 and an associated image capture subsystem, printer 106, and control subsystem 108.

Mobile base 102 may be fully manually moved, for example, as a push-cart, or it may have its own drive source. For example, mobile base 102 may have motor-driven wheel pairs 104 (e.g., motor-driven lead wheels), allowing mobile base 102 to advance a preset distance along the direction in which it is currently oriented. One or both of wheel pairs 104 may be encoded, such that the distance it has travelled along an aisle may be electronically detected and provided to control subsystem 108 for logging and processing. Further, one or both of wheel pairs 104 may be encoded such that turns, e.g., of 90°, may be electronically detected and provided to control subsystem 108 for logging and processing.

Image capture devices 110 includes digital cameras, such as point-and-shoot or digital single-lens reflex (DSLR) models. In general, image capture devices may be paired, with one set of image capture devices directed to capture images to the left side of mobile base 102, and another set of image capture devices directed to capture images to the right of mobile base 102. Each set of image capture devices 110 may include multiple cameras 110 to capture simultaneous adjacent (e.g., side-by-side and/or above-and-below) images. Alternately, a single high resolution camera may be mounted on a vertical slider, such that it slides (e.g., manually adjusted by an operator, or automatically motor driven) to align with respective shelf positions to capture images. Some embodiments electronically sense and provide electronic data representing the slider position in association with respective acquired images to control subsystem 108.

Note that the use of multiple image capture devices 110 obviates the need for very high resolution cameras. That is, standard resolution cameras (e.g., 20 megapixels or less) positioned at the center of a typical retail store aisle cannot generally both capture images of multiple items on a store shelf (e.g., a six-foot breadth), and provide sufficient detail to detect and interpret standard-size bar codes (e.g., less than 1.5 inches across). Accordingly, multiple cameras may be used in some embodiments. Each of the multiple cameras may capture smaller shelf portions, e.g., one item section at a time, in sufficient detail to detect and interpret, e.g., standard size bar codes.

Image capture devices 110 form part of an image capture subsystem, which may include an image processor. The image processor may be implemented as software and/or hardware within control subsystem 108, or in dedicated hardware and/or software and/or firmware. The image processor may construct, from data delivered by multiple image capture devices 110, a composite image of a section of shelving. Moreover, the image processor may analyze the composite captured image to extract item identifying data from images of product packaging and/or from shelf tag data. Example item identifying data may be extracted from, e.g., bar codes, quick response (QR) codes, product packaging, and/or product labeling.

Printer 106 may include a laser or LED black-and-white printer, or a color printer, for example. Printer 106 may be coupled to control subsystem 108 using, e.g., direct electrical connection by way of USB ports. Printer 106 may accept preformatted sheets in a tray of printer 106.

Preformatted sheets suitable for printer 106 may include logos, perforations, or other formatting features. In general, the preformatted sheets may be unique to each retail chain. For a given chain, a single preformatted design may be sufficient. The preformatted sheets may be heavy stock paper, e.g., card stock. A party distinct from the retail chains may provide, on a regular basis, bulk quantities of preformatted sheets to each store. This permits delivery of signage stock in advance of actual signage usage, thus de-stressing central production and shipment.

In general, control subsystem 108 is communicatively coupled to, and coordinates operations of, mobile base 102, the image capture subsystem, image capture devices 110, printer 106, and a database of store items, described below.

Control subsystem 108 includes interface capabilities, e.g., direct electrical connection such as Ethernet or Firewire, and/or wireless connection such as WiFi or Bluetooth. Such interface capabilities permit control subsystem 108 to download information from a database of store items. The database may be physically located on the premises of retail store(s) for which the system is deployed, of located remote from such store(s). In the latter case, control subsystem 108 may download information from the database by, for example, accessing a web page. The database may include data associating certain store items with signage printing requirements, e.g., signage images. More particularly, the database may associate item identifying data extracted from computer-recognizable optical features such as bar codes, QR codes, product labels, and/or product packaging, with signage printing requirements, such as signage images. Further, the database may associate such item identifying data with signage removal information, e.g., data representing that existing signage associated with an item is to be removed.

Control subsystem 108 includes an interface to mobile base 102, e.g., wheels 104. For embodiments in which mobile base 102 is motorized, control subsystem 108 may control operation of the motor. For embodiments in which mobile base 102 is manually positioned, control subsystem 108 may prompt the operator to move the cart, e.g., forward, backwards, or turn to left or right 90°. In general, a position of wheels 104 is provided to control subsystem 108 so it can keep track of cart position, e.g., using dead reckoning.

Control subsystem 108 further includes a user interface, such as a computer monitor together with a graphical user interface and/or audio output device such as a speaker. Such an interface may be configured to display and/or deliver audio to a system operator. Example displays and/or audio prompts include operational indications, such that indications that signage is to be removed from an output of printer 106 and placed in association with an item, indications that existing signage is to be removed from a store shelf, indications that the system is to be moved (e.g., forward, backward, turned left or right), and/or indications that image capture devices 110 are to be moved relative to mobile base 102 (e.g., left, right, up or down). Further example displays and/or audio prompts include maintenance indications, such as indications that printer 106 requires additional preformatted sheets, indications that printer 106 requires maintenance such as added toner, and/or indications that printer 106 requires service, e.g., due to a jam.

Figure 2:
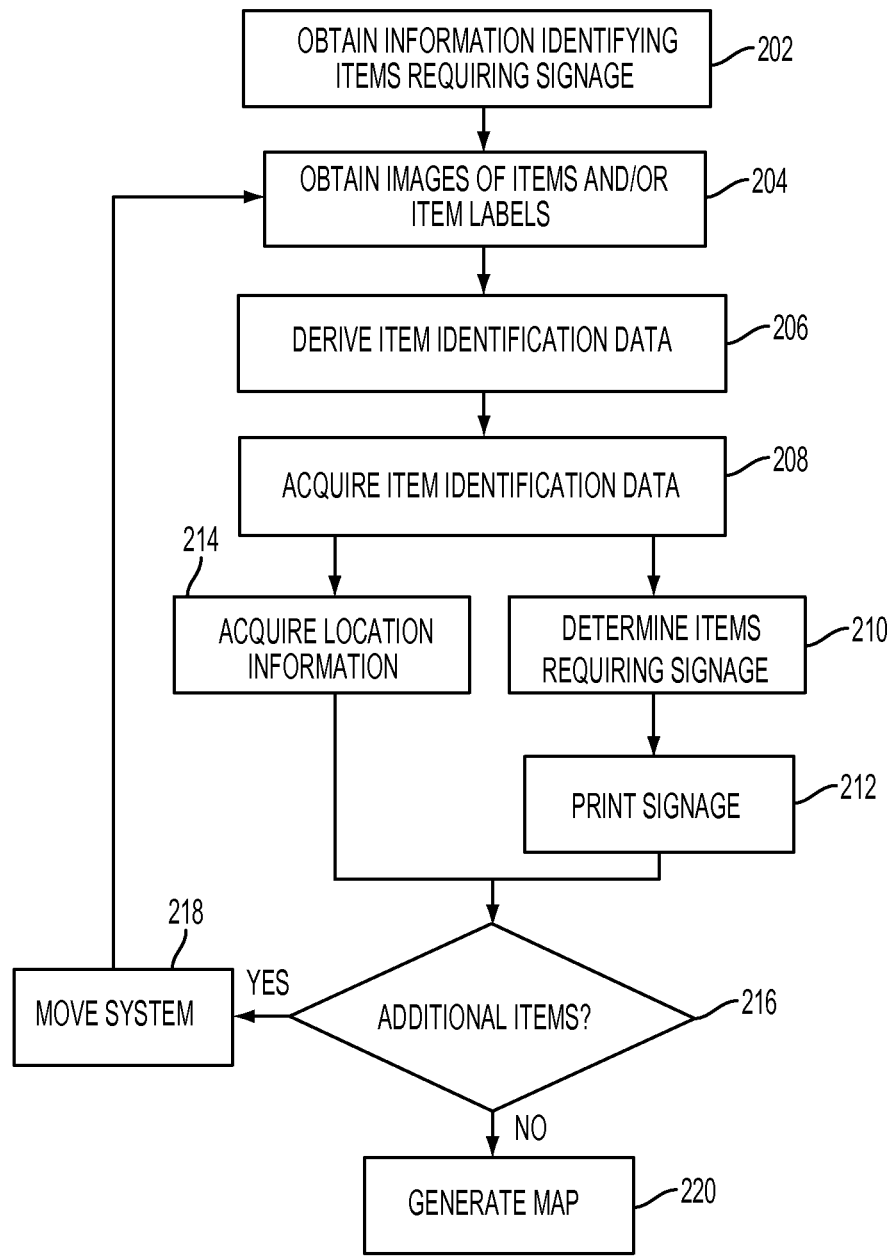
FIG. 2 is a flowchart of example methods according to some embodiments.

FIG. 2 is a flowchart of example methods according to some embodiments. The methods of FIG. 2 may be implemented using the system shown and described in reference to FIG. 1.

At block 202, the method obtains information identifying items requiring signage. This block may be initiated by an operator interacting with a user interface of control system 108, or may be initiated automatically, e.g., periodically, such as daily. In some embodiments, the operations of this block include the control subsystem 108 assessing and downloading all or a portion of the contents of a database. Such a database, as described above, may associate data extracted from computer-recognizable optical features such as bar codes, QR codes, product labels, and/or product packaging, with signage printing requirements, such as signage images and/or indications that signage is to be removed. The associations may be implemented by utilizing multiple columns within a single database row, e.g., a single row that includes item identification data in a first column and an associated signage image in a second column.

At block 204, the method obtains images of items and/or item labels, such as bar codes, QR codes, image packaging, or other label types. The operations of this block may be performed by image capture devices 110, e.g., in concert with the image capture subsystem and/or the control subsystem 108. Control subsystem 108 may prompt an operator to adjust a position of image capture devices 110 (or automatically position such devices) relative to store shelving. Once positioned, in some embodiments, control subsystem 108 provides a trigger signal to image capture devices and/or the image capture subsystem to acquire and/or store image data. In some embodiments, an operator first provides an indication to control subsystem that the system is in position, and control subsystem then provides such a trigger signal.

At block 206, the method derives item identification data from the captured images. The operations of this block may be performed by the image processor of the image capture subsystem, using, e.g., image recognition techniques, QR data extraction techniques, barcode data extraction techniques, etc. The item identification data itself may be in the form of ASCII characters, for example.

At block 208, the method (e.g., at control subsystem 108) acquires the item identification data. For example, control subsystem 108 may obtain the data from the image processor of the image capture subsystem. In embodiments in which the image processor is implemented as part of control subsystem 108, the actions of this block represent the data being passed between such processes.

From block 208, the method may follow either or both of the paths leading to respective blocks 210 and 214. In some embodiments, the process iterates, per block 216, through block 214 rather than through blocks 210 and 212, throughout the entire retail environment, concluding with block 220. In such embodiments, the map of block 220 includes locations of items requiring signage. Further, after control subsystem 108 has received a complete list of recognized items from throughout the retail environment, the process may repeat by iterating, per block 216, through blocks 210 and 212 rather than through block 214. Thus, in such embodiments, a first pass through the retail environment generates a map of locations of items requiring signage, and a second pass generates the corresponding signage for operator installation. In other embodiments, the signage is printed upon identification of items requiring signage, in real time. In such environments, a single pass through the retail environment may be sufficient to generate and install signage for the items requiring signage, and a map may or may not be generated at the conclusions of the method.

At block 214, the method (e.g., at control subsystem 108) acquires location information. The location information may include data encoded by wheel pairs 104, representing a distance travelled and/or a turn performed. The location information may be acquired in raw form, or in terms of units of measurement, e.g., feet or meters. For purposes of implementing dead reckoning, the location information may include at an initial stage of the method a specific location within a floor plan, for example. Such a specific location may be identified by an operator on a depiction of the retail environment floor plan in a graphical display of control subsystem 108. From block 214, control may pass to block 216 and/or block 210.

At block 210, the method determines items requiring signage. At this block, the method, e.g., control subsystem 108, performs a comparison between the item identification data acquired at block 208 and the information identifying items requiring signage obtained at block 202. If the item identification data of block 208 matches the information identifying items requiring signage of block 202, then the method, e.g., control subsystem 108, obtains the corresponding signage images and/or other signage requirements. The corresponding signage images and/or other signage requirements may be retrieved from the database or database portion obtained at block 202. This information, as well as control, then passes to block 212.

In some embodiments, block 210, or a different stage in the process, includes determining whether any signage requires removal. This action may be paired with the actions of block 212, such that an operator both removes signage and installs new signage for the same items. For this action, the method, e.g., control subsystem 108, performs a comparison between the item identification data acquired at block 208 and the information identifying items requiring signage obtained at block 202. If the item identification data of block 208 matches the information identifying items requiring signage of block 202, and if the corresponding information indicates that signage is to be removed, then control subsystem 108 prompts an operator to remove the corresponding signage. The prompt may include a graphical display on control subsystem 108 of the signage to be removed.

At block 212, the method prints signage. The actions of this block may be performed by control subsystem 108 supplying printer 106 with the signage images or other information, e.g., over a USB bus. Printer 106 proceeds to print the signage image onto the preformatted sheets loaded into its tray. As the signage is created, a user interface of control subsystem 108 prompts the operator to attach the signage to the shelf. Optionally, the user interface may direct the operator in the specific location of the signage, e.g., "attach to shelf four". From block 212, control may pass to block 214 and/or block 216.

At block 216, the method determines whether additional items require signage and/or signage removal. To do so, control subsystem 108 may check the information identifying items requiring signage obtained at block 202. If additional items require signage, and the signage has not been provided during an operation of the system, then control may pass to block 218. In such embodiments, an operator may determine that any remaining signage is for items not in stock, and terminate the process at that stage. In some embodiments, even if no additional items require signage, control may yet pass to block 218 in order for the system to acquire data used to generate a map per block 220.

In some embodiments, if no additional items require signage per block 216, then the process may end. In some embodiments, if no additional items require signage per block 216, then control may pass to block 220.

At block 220, the method generates a map. The map may be generated based on a floor plan, e.g., provided to control subsystem 108. In particular, the map may include item location data overlayed onto such a floor plan. The map may include data based on the location information obtained at block 218 using dead reckoning, for example. The map may associate locations derived from a dead reckoning process with items identified at block 206. That is, by determining the system's current position in the store floor plan throughout the method of FIG. 2, position data can be associated with the images captured at that position. The system thus constructs an accurate map of item locations along aisles within the retail environment from the detected item identification data and location information. The map may be stored as, for example, an image or other graphical data structure in control subsystem 108.

Embodiments may utilize the map generated at block 220 for various purposes. Such purposes include, for example, store profiling, inventory management, and planogram compliance, e.g., as agreed to with retail chains or with third parties. Further, the map may be transmitted to a store-based or chain information technology system. This allows validation that a particular retail store's shelving layout complies with the chain's requirements, as well as other functions.

In some embodiments, the system of FIG. 1 and method of FIG. 2 may be used in combination with centralized signage printing. Such embodiments are particularly suitable in retail environments in which the spatial layout of items is constantly changing (and thus signage requiring frequent updating) or in environments in which the layout has not yet been determined for the first time.

Note that some embodiments permit partial implementation of the method of FIG. 2. For example, signage for an aisle whose products change frequently, such as seasonal merchandise aisle, may be created more frequently by using the system of FIG. 1 on those aisles more frequently, thus potentially reducing time on aisles whose products and/or pricing does not change often.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for printing signage for use in a retail store, the system comprising:
   a self-propelled mobile base;
   a printer in physical contact with the mobile base;
   an image capture subsystem physically disposed on the mobile base and communicatively coupled to the printer, the image capture system comprising a plurality of image capture devices and at least one image processor, wherein the image capture subsystem is configured to obtain a single image of multiple items in the retail store using the plurality of image capture devices, wherein the multiple image capture devices are configured to simultaneously obtain images of items at differing heights, and wherein the image processor is configured to derive item identification data for the multiple items from the single image of multiple items; and
   a control subsystem communicatively coupled to the printer and to the image capture subsystem, wherein the mobile base is configured to provide travel distance data to the control subsystem, wherein the control subsystem is configured to receive information identifying items requiring signage displaying a price, acquire item identification data from the image capture subsystem, determine, based on the information identifying items requiring signage displaying a price and on the item identification data, items requiring signage displaying a price, wherein the image processor is configured to derive item identification data from at least one of item signage and item packaging, and to direct the printer to print signage for the items requiring signage displaying a price.

2. The system of claim 1, wherein the control subsystem is further configured to acquire location information and generate, based on the location information, a map of item locations within the retail store.

3. The system of claim 1, wherein the control subsystem is configured to prompt an operator to at least one of: move the system, install printed signage, or remove existing signage.

4. The system of claim 3, wherein the control subsystem is further configured to receive information identifying items for which signage is to be removed, and determine, based on the information identifying items for which signage is to be removed and on the item identification data, items requiring signage removal, wherein the control subsystem is configured to prompt an operator to remove existing signage of the items requiring signage removal.

5. A method of printing signage for use in a retail store, the method comprising:

obtaining, by a control subsystem of a system for printing signage for use in a retail store, information identifying items requiring signage, the system for printing signage for use in a retail store comprising a self-propelled mobile base, a printer in physical contact with the mobile base, an image capture subsystem physically disposed on the mobile base and communicatively coupled to the control subsystem, and the control subsystem, wherein the image capture subsystem comprises at least one image capture device and at least one image processor, wherein the control subsystem is communicatively coupled to the printer and to the image capture subsystem;

obtaining, by the image capture subsystem comprising a plurality of image capture devices, a single image of multiple items present on shelves in the retail store and obtaining, simultaneously, images of items at differing heights by the multiple image capture devices;

deriving, by the image processor and from at least one of item signage and item packaging, item identification data for the multiple items from the single image of multiple items;

acquiring, by the control subsystem, item identification data from the image capture subsystem;

providing, by the mobile base, travel distance data to the control subsystem;

determining, by the control subsystem and based on the information identifying items requiring signage displaying a price and on the item identification data, items requiring signage displaying a price; and printing, by the printer, signage for the items requiring signage displaying a price.

6. The method of claim 5, further comprising:

acquiring, by the control subsystem, location information; and generating, based on the location information, a map of item locations within the retail store.

7. The method of claim 5, further comprising:

prompting, by the control subsystem, an operator to at least one of: move the system, install printed signage, or remove existing signage.

8. The method of claim 7, further comprising:

obtaining, by the control subsystem, information identifying items requiring signage removal;

determining, by the control subsystem and based on the information identifying items requiring signage removal and on the item identification data, items requiring signage removal; and prompting, by the control subsystem, an operator to remove existing signage of the items requiring signage removal.

* * * * *